(12) United States Patent
Verbeke et al.

(10) Patent No.: US 12,277,783 B2
(45) Date of Patent: Apr. 15, 2025

(54) ANNOTATION OF OBJECTS IN IMAGE FRAMES

(71) Applicant: Zenseact AB, Gothenburg (SE)

(72) Inventors: Willem Verbeke, Gothenburg (SE); William Ljungbergh, Gothenburg (SE); Olle Månsson, Gothenburg (SE)

(73) Assignee: Zenseact AB, Gothenburg (SE)

( * ) Notice: Subject to any disclaimer, the term of this patent is extended or adjusted under 35 U.S.C. 154(b) by 48 days.

(21) Appl. No.: 18/347,019

(22) Filed: Jul. 5, 2023

(65) Prior Publication Data
US 2024/0013560 A1    Jan. 11, 2024

(51) Int. Cl.
| | | |
|---|---|---|
| *H04N 7/18* | (2006.01) | |
| *G06T 7/20* | (2017.01) | |
| *G06V 10/60* | (2022.01) | |
| *G06V 20/56* | (2022.01) | |
| *G06V 20/70* | (2022.01) | |

(52) U.S. Cl.
CPC ............ *G06V 20/70* (2022.01); *G06T 7/20* (2013.01); *G06V 10/60* (2022.01); *G06V 20/56* (2022.01); *G06T 2207/30236* (2013.01); *G06T 2207/30252* (2013.01)

(58) Field of Classification Search
CPC .......... H04N 7/18; G06V 20/70; G06V 10/60; G06V 20/56; G06T 7/20; G06T 2207/30236; G06T 2207/30252

USPC ......................................................... 348/148
See application file for complete search history.

(56) References Cited

U.S. PATENT DOCUMENTS

| | | | | |
|---|---|---|---|---|
| 10,872,251 | B2 * | 12/2020 | Shen ....................... | G06T 7/246 |
| 10,956,747 | B2 * | 3/2021 | Barzelay ............... | G06F 3/0484 |
| 11,841,434 | B2 * | 12/2023 | Shen .................... | G06V 10/776 |
| 2020/0090322 | A1 | 3/2020 | Seo et al. | |
| 2022/0156939 | A1 | 5/2022 | Homayounfar et al. | |

OTHER PUBLICATIONS

EPO Communication with European Search Report dated Jan. 2, 2023 for European Patent Application No. 22183357.7 filed Jul. 6, 2022, consisting of 9-pages.

* cited by examiner

*Primary Examiner* — Trang U Tran
(74) *Attorney, Agent, or Firm* — Weisberg I.P. Law, P.A.

(57) ABSTRACT

A method performed by an annotation system for supporting annotation of objects in image frames of a traffic environment-related video sequence. The annotation system determines an annotation of an object in an image frame of the video sequence, which annotation comprises at least a first property of the object; tracks the object through the video sequence; and assigns the at least first object property to the object in one or more previous and/or subsequent image frames of the video sequence. The annotation system further identifies at least a first image frame based on one or more criterion. Moreover, the annotation system appoints the at least first identified image frame as annotation data.

20 Claims, 5 Drawing Sheets

1 Annotation system

ANNOTATION OF OBJECTS IN IMAGE FRAMES

TECHNICAL FIELD

The present disclosure relates to supporting annotation of objects in image frames of a traffic environment-related video sequence.

BACKGROUND

Within the automotive field, there has for quite some years been activity in development of autonomous vehicles. An increasing number of modern vehicles have advanced driver-assistance systems, ADAS, to increase vehicle safety and more generally road safety. ADAS—which for instance may be represented by adaptive cruise control, ACC, lane centering, automatic lane changes, semi-automated parking, etc.—are electronic systems that may aid a vehicle driver while driving. Moreover, in a not-too-distant future, Autonomous Driving, AD, will to greater extent find its way into modern vehicles. AD along with ADAS will herein be referred to under the common term Automated Driving System, ADS, corresponding to all different levels of automation, for instance as defined by the SAE J3016 levels (0-5) of driving automation. An ADS may be construed as a complex combination of various components that can be defined as systems where perception, decision making, and operation of the vehicle—at least in part—are performed by electronics and machinery instead of a human driver. This may include awareness of surroundings as well as handling of the vehicle. While the automated system has control over the vehicle, it allows the human operator to leave all or at least some responsibilities to the system. For instance, an ADS at level 4 or above—such as defined by SAE J3016—may offer unsupervised automated driving, which thus may lead to enhanced comfort and convenience by allowing vehicle occupants such as the driver to engage in non-driving related tasks. To perceive its surroundings, an ADS commonly combines a variety of sensors, such as e.g. radar, lidar, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

Moreover, when it comes to computer vision—such as involving one or more e.g. cameras of an ADS-equipped vehicle—machine learning algorithms are commonly used to solve many tasks thereof. A fundamental necessity for training supervised or semi-supervised algorithms is a data set of annotated examples, which the algorithm uses to learn from. In all but a few cases—notably common for building self-driving vehicles—the annotated examples are single images frames. One can take a continuous stream of data such as a captured video sequence, and annotate single image frames out of this data set. The annotations are almost always made by human annotators, who look at the image frame(s) and then set the correct properties.

A fundamental limitation in human annotations of individual images, however, is that when objects are too distant, or other factors limit the visibility, it might no longer be possible for a human to annotate the object(s) in the image. A concrete example would be e.g., a traffic sign in an image, that is so far away that it is impossible for a human annotator to see what type of traffic sign it is. An example of another factor that could limit visibility, is motion blur for objects at the edge of a camera view. One can imagine a vehicle driving by e.g. a traffic sign at high speed; when the vehicle is about to pass by said sign, the motion blur in the image is often so severe, that it is impossible for a human annotator to see what kind of traffic sign it is.

The fact that most data sets commonly only can be correctly annotated under circumstances where humans are able to identify what exactly is in the image, is a limiting factor for machine learning algorithms such as deep learning algorithms e.g. intended for ADSs.

SUMMARY OF THE INVENTION

It is therefore an object of embodiments herein to provide an approach for supporting annotation of objects in image frames of a traffic environment-related video sequence, in an improved and/or alternative manner.

The object above may be achieved by the subject-matter disclosed herein. Embodiments are set forth in the appended claims, in the following description and in the drawings.

The disclosed subject-matter relates to a method performed by an annotation system for supporting annotation of objects in image frames of a traffic environment-related video sequence. The annotation system determines an annotation of an object in an image frame of the video sequence, which annotation comprises at least a first property of the object. The annotation system further tracks the object through the video sequence. Moreover, the annotation system assigns the at least first object property to the object in one or more previous and/or subsequent image frames of the video sequence. The annotation system further identifies at least a first of the previous and/or subsequent image frames in which: pixel area dimensions of the object are below an object type- and/or property type-specific threshold stipulating pixel area dimensions below which the at least first object property is defined undetectable e.g. to a human and/or motion blur in pixels of at least a predeterminable portion of the object exceeds a motion blur threshold stipulating a motion blur level above which the at least first object property is defined undetectable e.g. to a human and/or brightness in pixels of at least a predeterminable portion of the object exceeds a brightness threshold stipulating a brightness level above which the at least first object property is defined undetectable e.g. to a human. Furthermore, the annotation system appoints the at least first identified image frame as annotation data.

The disclosed subject-matter further relates to an annotation system for—and/or adapted and/or configured for—supporting annotation of objects in image frames of a traffic environment-related video sequence. The annotation system comprises an annotation determining unit for determining an annotation of an object in an image frame of the video sequence, which annotation comprises at least a first property of the object. The annotation system further comprises an object tracking unit for tracking the object through the video sequence. Moreover, the annotation system comprises a property assigning unit for assigning the at least first object property to the object in one or more previous and/or subsequent image frames of the video sequence. Furthermore, the annotation system comprises a frames identifying unit for identifying at least a first of the previous and/or subsequent image frames in which: pixel area dimensions of the object—in the at least first previous and/or subsequent image frame—are below an object type- and/or property type-specific threshold stipulating pixel area dimensions below which the at least first object property is defined undetectable, e.g. to a human; and/or motion blur in pixels of at least a predeterminable portion of the object—in the at least first previous and/or subsequent image frame—exceeds a motion blur threshold stipulating a motion blur level above which the at least first object property is defined undetectable, e.g. to a human; and/or brightness in pixels of at least a predeterminable portion of the object—in the at least first previous and/or subsequent image frame—exceeds a brightness threshold stipulating a brightness level above which the at least first object property is defined undetectable, e.g. to a human. The annotation system further comprises an annotation data appointing unit for appointing the at least first identified image frame as annotation data.

Furthermore, the disclosed subject-matter relates to an arrangement, for instance an offboard system and/or a vehicle, comprising an annotation system as described herein.

Moreover, the disclosed subject-matter relates to a computer program product comprising a computer program containing computer program code means arranged to cause a computer or a processor to execute the steps of an annotation system described herein, stored on a computer-readable medium or a carrier wave.

The disclosed subject-matter further relates to a non-volatile computer readable storage medium having stored thereon said computer program product.

Thereby, there is introduced an approach enabling annotations to be made for traffic situation-related images under circumstances where an annotation based on a prevailing image would commonly not be possible, e.g. by a human. That is, since there according to the introduced concept is determined an annotation of an object in an image frame of a traffic environment-related video sequence, which annotation comprises at least a first property of the object, there is established and/or derived a—e.g. machine-generated and/or user-inputted—annotation of at least a first object e.g. a traffic sign in a selected image frame of the video sequence, which annotation contains one or more pieces of—e.g. static—semantic information of the object, such as e.g. type of object, type of sign, shape, colour(s), and/or speed limit etc. of—and/or dirt and/or damage etc. on—the object e.g. traffic sign. Furthermore, that is, since the object is tracked through the video sequence, the object—e.g. the exemplifying traffic sign—may, e.g. with support from one or more—e.g. known—trackers, be tracked backward and/or forward in time through previous and/or subsequent image frames of the video sequence. Moreover, that is, since the at least first object property is assigned to the object in one or more previous and/or subsequent image frames of the video sequence, the one or more pieces of—e.g. static—semantic information associated with the object—which is/are comprised in the annotation of the object in the annotated image frame—is extrapolated and/or extended to the corresponding object in one or more past and/or later image frames of the video sequence. Accordingly, properties of the object such as e.g. type of object, type of sign, shape, colour(s), and/or speed limit etc. e.g. of—and/or dirt and/or damage etc. on—the object e.g. traffic sign, may be assigned the matching object in at least a first previous and/or subsequent image frame. In other words, with the introduced concept, by using knowledge from an original e.g. single—further e.g. clear—annotated image frame, more image frames of the video sequence—e.g. image frames for which annotations previously was not possible—may be annotated—such as assigned the at least first object property—in an automated manner. Furthermore, that is, since there is identified at least a first of the previous and/or subsequent image frames in which pixel area dimensions of the object—in the at least first previous and/or subsequent image frame—are below an object type- and/or property type-specific threshold stipulating pixel area dimensions below which the at least first object property is defined undetectable, e.g. to a human, at least a first previous and/or subsequent image frame of the video sequence may be identified, in which the corresponding object—e.g. due to being relatively far away—has pixel area dimensions smaller than a threshold defining a limit for when an object property of the type of object to which the object belongs—and/or of the type of property to which the at least first object property belongs—is deemed and/or defined to no longer be identifiable, e.g. by a human annotator. Accordingly, there may be singled out one or more image frames—in which the corresponding object has been annotated with the at least first object property as assigned from the original annotation and which corresponding object further has pixel area dimensions which have decreased below the defined object property detectability limit—which image frames thus have been annotated beyond commonly known and/or ordinary—e.g. human—perception and/or detectability. Moreover, that is, since there additionally or alternatively is identified at least a first of the previous and/or subsequent image frames in which motion blur in pixels of at least a predeterminable portion of the object—in the at least first previous and/or subsequent image frame—exceeds a motion blur threshold stipulating a motion blur level above which the at least first object property is defined undetectable, e.g. to a human, at least a first previous and/or subsequent image frame of the video sequence may be identified, in which the corresponding object—e.g. due to to relative motion and/or relatively high angular velocity—has motion blur in e.g. a significant portion of its pixels exceeding a threshold defining a limit for when motion blur is deemed and/or defined to render the at least first object property no longer identifiable, e.g. by a human annotator. Accordingly, there may be singled out one or more image frames—in which the corresponding object has been annotated with the at least first object property as assigned from the original annotation and which corresponding object further has pixels with motion blur that has increased above the defined object property detectability limit—which image frames thus have been annotated beyond commonly known and/or ordinary—e.g. human—perception and/or detectability. Furthermore, that is, since there additionally or alternatively is identified at least a first of the previous and/or subsequent image frames in which brightness in pixels of at least a predeterminable portion of the object—in the at least first previous and/or subsequent image frame—exceeds a brightness threshold stipulating a brightness level above which the at least first object property is defined undetectable, e.g. to a human, at least a first previous and/or subsequent image frame of the video sequence may be identified, in which the corresponding object—e.g. due to to sunlight and/or glare and/or relatively rapid lighting changes—has brightness—and/or potentially brightness change rate—in e.g. a significant portion of its pixels exceeding a threshold defining a limit for when brightness—and/or potentially brightness change rate—is deemed and/or defined to render the at least first object property no longer identifiable, e.g. by a human annotator. Accordingly, there may be singled out one or more image frames—in which the corresponding object has been annotated with the at least first object property as assigned from the original annotation and which corresponding object further has pixels with brightness—and/or potentially brightness change rate—that has increased beyond the defined object property detectability limit—which image frames thus have been annotated beyond commonly known and/or ordinary—e.g. human—perception and/or detectability. Moreover, that is, since the at least first identified image frame is appointed as annotation data, a data set of annotated image frames is accomplished in an efficient manner, derived and/or generated out of an original e.g. single annotated image frame, covering annotations—comprising the assigned object properties—for objects which corresponding object properties in the prevailing image frames are deemed unidentifiable. Accordingly, there is provided and/or supported an extended automatically generated annotation data set—e.g. intended for computer vision machine learning algorithm training e.g. intended for an ADS—which data set covers image frames which traditionally—e.g. based on a per-image basis—would not be possible to annotate. Consequently, according to an example, with the introduced concept, by using a video sequence and a e.g. human-annotated image frame thereof as described herein, there may be created a data set of annotations not limited by e.g. human perception.

For that reason, an approach is provided for supporting annotation of objects in image frames of a traffic environment-related video sequence, in an improved and/or alternative manner.

The technical features and corresponding advantages of the above-mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
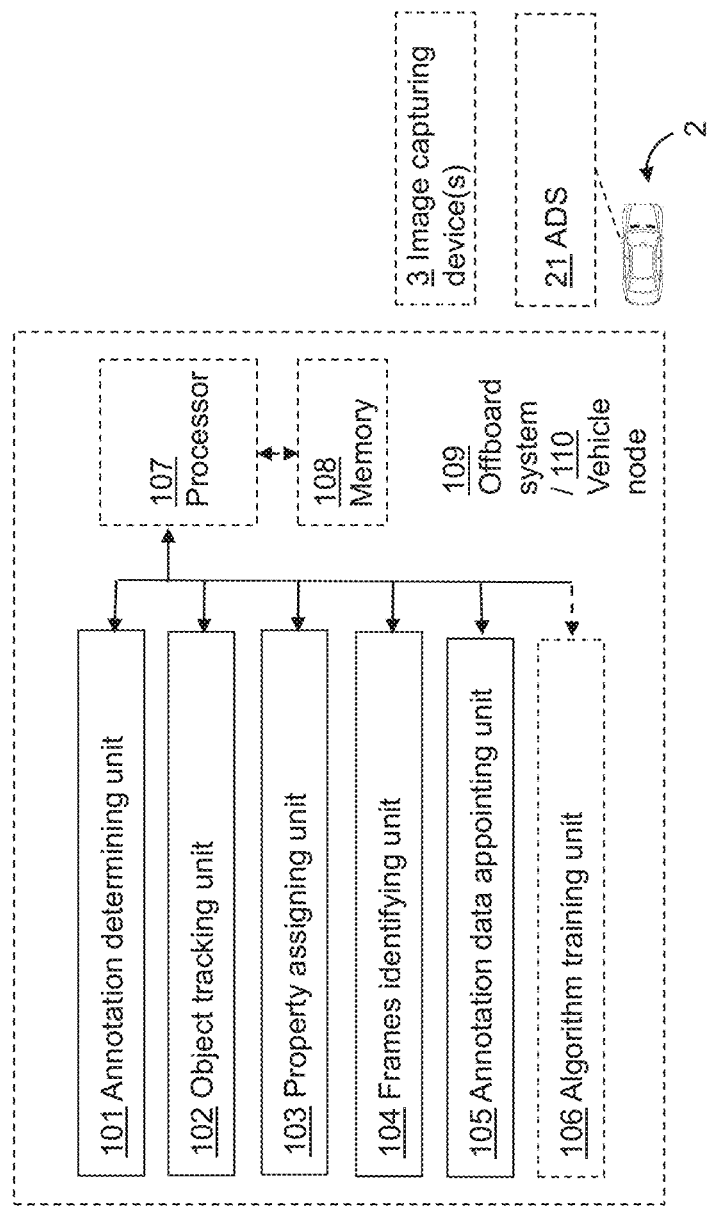
FIG. 1 is a schematic block diagram illustrating an exemplifying annotation system according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to supporting annotation of objects in image frames of a traffic environment-related video sequence, there will be disclosed an approach enabling annotations to be made for traffic situation-related images under circumstances where an annotation based on a prevailing image would commonly not be possible, e.g. by a human.

Figure 2A:
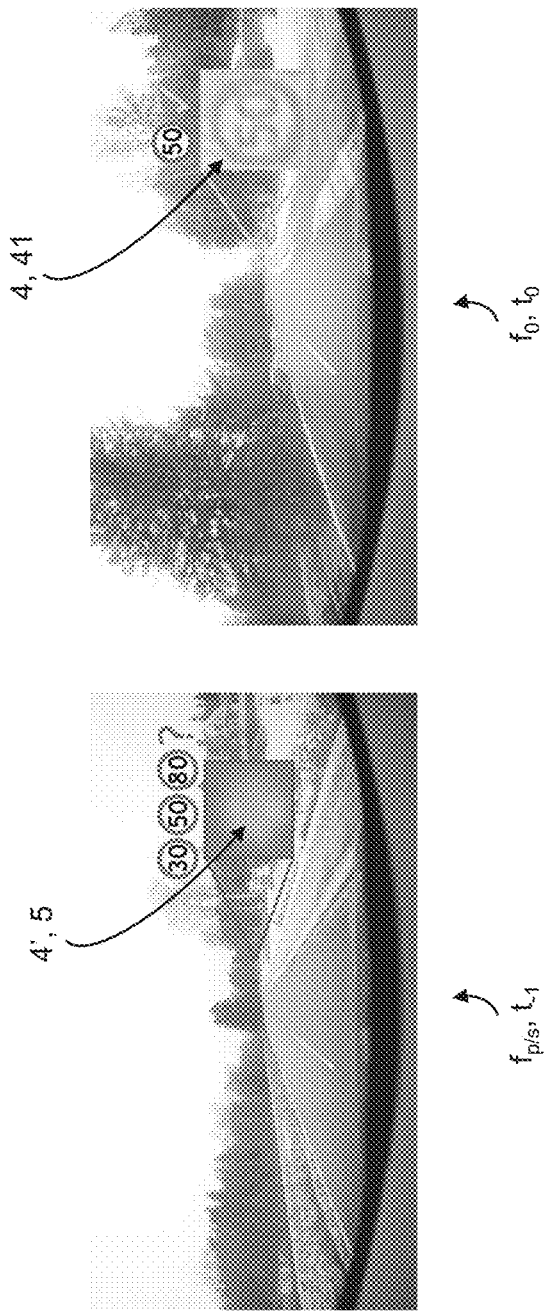
FIGS. 2a, 2b and 2c illustrate schematic views of exemplifying image frames of an exemplifying annotation system according to embodiments of the disclosure.
Figure 2B:
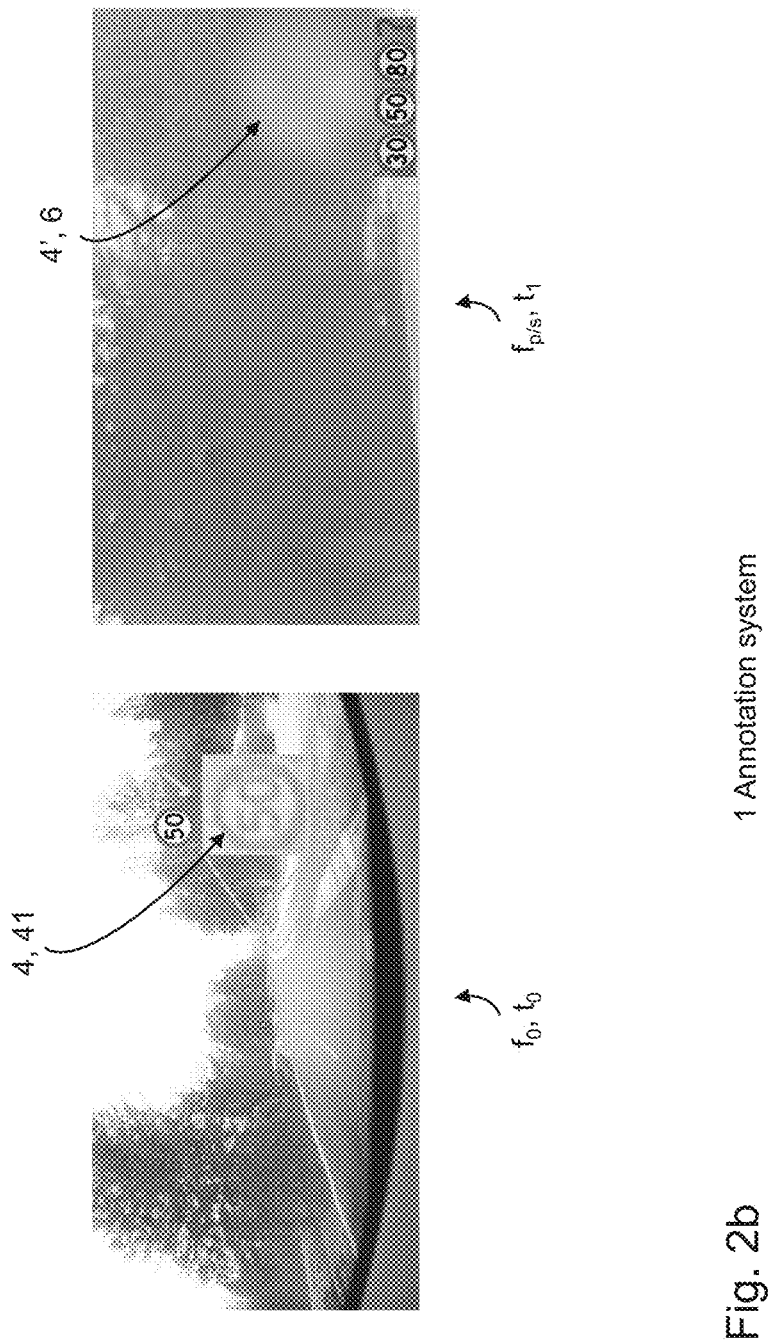
Figure 2C:
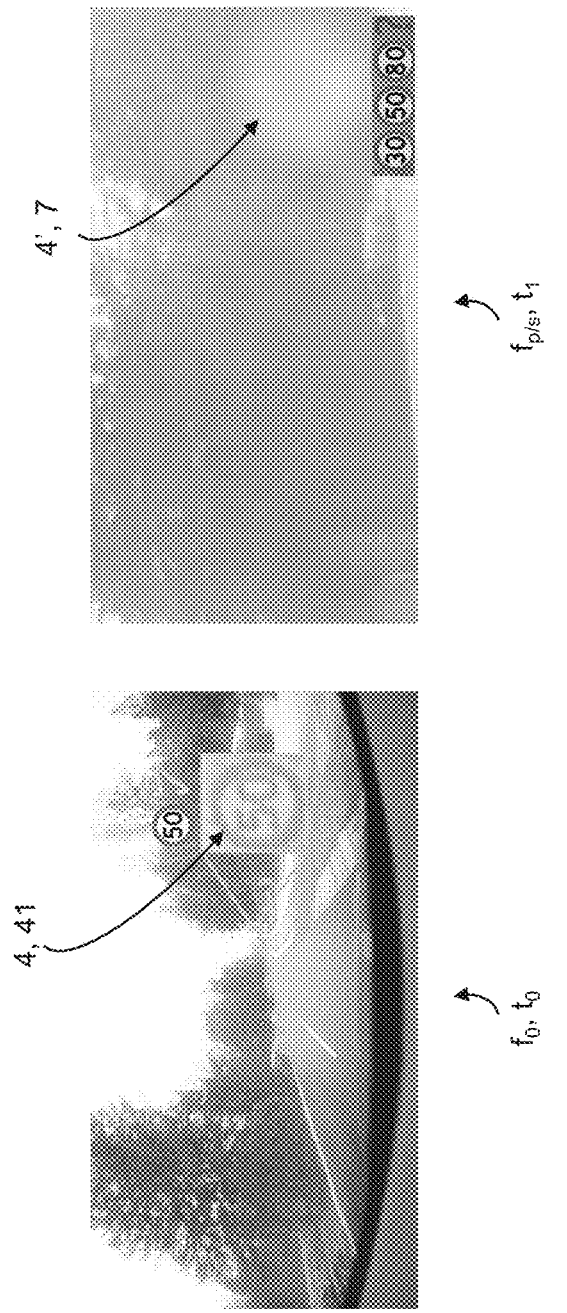

Referring now to the figures, there is depicted in FIG. 1 a schematic block diagram—and in FIGS. 2a-c schematic views of exemplifying image frames—of an exemplifying annotation system 1 according to embodiments of the disclosure. The annotation system 1 is adapted for supporting annotation of objects in image frames of a traffic environment-related video sequence. Such objects may be represented by any feasible—for instance commonly known—objects that may be encountered and/or captured during traffic environment-related circumstances, and for instance relate to dynamic objects such as road users e.g. vehicles, bicycles, commonly known vulnerable road user such as e.g. pedestrians, etc., and/or static objects such as traffic environment-related infrastructure and/or static surroundings e.g. road signs, traffic lights, traffic signals, reflector posts, constructions cones, road markings, roadside buildings and/or trees, etc. The video sequence on the other hand, which potentially may be pre-recorded and further be referred to as a series of image frames of any feasible number, may be of any feasible format and/or duration—for instance ranging from a few milliseconds up to tens of seconds or minutes or more—and further be captured and/or have been captured in any feasible traffic situation-related and/or road surroundings-related environment at any feasible instant in time, to subsequently be made available to and/or retrievable by the annotation system 1. The video sequence may for instance be captured and/or have been captured by at least a first image capturing device 3 represented by any feasible device(s)—such as camera(s)—adapted and/or configured for capturing images such as video sequences. The at least first image capturing device 3 may for instance be comprised in—and/or be carried by—any feasible arrangement and/or carrier, for instance a surveillance system, human and/or a vehicle 2; FIGS. 2a-c for instance, exemplifies a respective video sequence captured by a camera onboard a vehicle 2 traveling along a road. The optional vehicle 2—e.g. referred to as a road-driven vehicle—may be represented by any arbitrary—e.g. known—manned or unmanned vehicle, potentially represented by an engine-propelled or electrically-powered vehicle such as a car, truck, lorry, van, bus and/or tractor. The vehicle 2 may according to an example further be equipped with an ADS 21, which may be represented by any arbitrary ADAS or AD system e.g. known in the art and/or yet to be developed. Moreover, the optional vehicle 2 and/or ADS 21 may comprise, be provided with and/or have onboard an optional perception system (not shown) and/or similar system and/or functionality adapted to estimate surroundings of the vehicle 2, and subsequently adapted to estimate world views of the surroundings e.g. with support from a digital map such as a high definition (HD) map and/or standard definition (SD) map, and/or an equivalent and/or successor thereof, e.g. provided onboard the vehicle 2 and/or on at least a first remotely accessible server. Such a perception system may refer to any commonly known system, module and/or functionality, e.g. comprised in one or more electronic control modules, ECUs, and/or nodes of the vehicle 2 and/or the ADS 21, adapted and/or configured to interpret sensory information—relevant for driving of the vehicle 2—to identify e.g. objects, obstacles, vehicle lanes, relevant signage, appropriate navigation paths etc. The perception system—which may be adapted to support e.g. sensor fusion, tracking, localization etc. —may thus be adapted to rely on sensory information. Such exemplifying sensory information may, for instance, be derived from one or more—e.g. commonly known—sensors comprised in and/or provided onboard the vehicle 2 adapted to sense and/or perceive said vehicle's 2 whereabouts and/or surroundings, for instance represented by one or a combination of one or more of surrounding detecting sensors and/or a positioning system, odometer, inertial measurement units etc. In other words, such a perception system is in the present context thus to be understood as a system responsible for acquiring raw sensor data from onboard sensors, such as at least from an at least first image capturing device 3, and converting this raw data into scene understanding.

The phrase "annotation system" may refer to "annotation scale-up system", "annotation data scale-up system", "annotation extending system" and/or "annotations supporting system", whereas "a method performed by an annotation system" may refer to "an at least partly computer-implemented method performed by an annotation system". Moreover, "for supporting annotation of objects in image frames" may refer to "for annotation of objects in image frames", "for supporting extended and/or scaled-up annotation of objects in image frames" and/or "for supporting extended and/or scaled-up annotation data", and according to an example further to "for supporting extended and/or scaled-up annotation data for training of a computer vision machine learning algorithm". The phrase "traffic environment-related video sequence", on the other hand, may refer to "traffic-related, traffic situation-related and/or road environment-related video sequence", and according to an example further to "traffic environment-related video sequence captured by an at least first image capturing device of and/or onboard a vehicle e.g. equipped with an ADS".

As illustrated in an exemplifying manner in exemplifying FIGS. 1-2, the annotation system 1 is—e.g. by means of an annotation determining unit 101—adapted and/or configured for determining an annotation of an object 4 in an image frame $f_0$ of the video sequence, which annotation comprises at least a first property 41 of the object 4. Thereby, there is established and/or derived a—e.g. machine-generated and/or user-inputted—annotation of at least a first object 4—such as illustrated in respective FIGS. 2a-c of e.g. a traffic sign—in a selected image frame $f_0$ of the video sequence, which annotation contains one or more pieces of—e.g. static—semantic information 41 of the object, such as e.g. type of object, type of sign, shape, colour(s), and/or speed limit etc. of—and/or dirt and/or damage etc. on—the exemplifying traffic sign.

The object 4 to annotate may be selected and/or have been selected in any feasible—e.g. known—manner. Similarly, the image frame $f_0$—in which the object 4 is annotated—may be selected and/or have been selected from out of the video sequence in any feasible—e.g. known—manner. In exemplifying FIGS. 2a-c, respective selected image frame $f_0$ in which the object 4 is annotated, is exemplified to be associated with a time stamp to. Moreover, the one or more properties 41 comprised in the annotation of the object 4, may be represented by any characteristics and/or semantic information of the object 4, such as e.g. static properties thereof. The annotation of the object 4 may take place at any feasible location, such as onboard a—e.g. ADS-equipped—vehicle 2 and/or remote therefrom, such as at an offboard entity, for instance an annotations-providing facility and/or annotation company. Determining an annotation of the object 4 may further be achieved in an any feasible—e.g. known—manner, such as deriving the annotation from input provided by a—e.g. human annotator—and/or producing a machine-generated annotation, such as with support from a machine learning algorithm and/or model. Optionally, determining an annotation of an object 4 may comprise—and/or the annotation determining unit 101 may optionally be adapted and/or configured for—deriving the annotation from a computer vision machine learning algorithm onboard a—e.g. ADS-equipped—vehicle 2. Thereby, the annotation may be generated on-edge of the vehicle 2 with support from a computer vision machine learning algorithm e.g. in shadow mode, under training and/or currently deployed.

The phrase "determining an annotation" may refer to "deriving, obtaining, generating, creating, making and/or producing an annotation", "determining at least a first annotation", "determining an original annotation", "determining a machine-generated and/or human-inputted annotation" and/or "determining online or offline an annotation", whereas "annotation of an object" may refer to "label and/or labelling of an object", "annotation of at least a first object" and/or "annotation of at least a portion of an object". Moreover, "object in an image frame" may refer to "object in a predeterminable and/or selected image frame", whereas "image frame" throughout may refer to "image". Moreover, "time stamp" may throughout refer to "timestep and/or point in time", whereas "image frame of said video sequence" may refer to "at least a first image frame of said video sequence" and/or image frame of a traffic environment-related video sequence". The phrase "annotation comprising at least a first property of said object", on the other hand, may refer to "annotation comprising at least a first attribute, characteristic, feature and/or piece of semantic information of said object", and according to an example further to "annotation comprising at least a first static or essentially static property of said object".

As illustrated in an exemplifying manner in exemplifying FIG. 1, the annotation system 1 is further—e.g. by means of an object tracking unit 102—adapted and/or configured for tracking the object 4 through the video sequence. Thereby, the object 4—in FIGS. 2a-c the exemplifying traffic sign—may, e.g. with support from one or more—e.g. known—trackers, be tracked backward and/or forward in time through previous and/or subsequent image frames of the video sequence. The object 4 may be tracked through the video sequence in any feasible—e.g. known—manner, for instance with support from at least a first tacker, e.g. a commonly known boosting tracker, Mil tracker and/or Goturn tracker, etc. and/or an equivalent and/or successor thereof. The object 4 may further be tracked through the video sequence for any feasible period of time and/or number of past and/or later image frames. The phrase "tracking said object through said video sequence" may thus refer to "tracking said object back and/or forth in time through said video sequence", "tracking said object through one or more image frames of said video sequence" and/or "tracking said object through at least a portion of said video sequence". According to an example, the object 4 may alternatively be tracked by a human such as a human annotator, e.g. skipping one or more intermediate frames, in which case the tracking step and/or object tracking unit 102 potentially may be left out.

As illustrated in an exemplifying manner in exemplifying FIGS. 1-2, the annotation system 1 is further—e.g. by means of a property assigning unit 103—adapted and/or configured for assigning the at least first object property 41 to the object 4' in one or more previous and/or subsequent image frames $f_{p/s}$ of the video sequence. Thereby, the one or more pieces of—e.g. static—semantic information 41 associated with the object 4—which is/are comprised in the annotation of the object 4 in the annotated image frame $f_0$—is extrapolated and/or extended to the corresponding object 4' in one or more past and/or later image frames $f_{p/s}$ of the video sequence. Accordingly, properties 41 of the object 4 such as e.g. type of object, type of sign, shape, colour(s), and/or speed limit etc. e.g. of—and/or dirt and/or damage etc. on—the exemplifying traffic sign depicted in FIGS. 2a-c, may be assigned the matching object 4', here traffic sign, in—as illustrated in exemplifying FIG. 2a—at least a first previous image frame $f_{p/s}$ and/or in—as illustrated in exemplifying FIGS. 2b and 2c—at least a first subsequent image frame $f_{p/s}$. In other words, with the introduced concept, by using knowledge from an original e.g. single—further e.g. clear—annotated image frame $f_0$, more image frames $f_{p/s}$ of the video sequence—e.g. image frames for which annotations previously was not possible—may be annotated—such as assigned the at least first object property 41—in an automated manner. The phrase "assigning said at least first object property" may thus refer to "extrapolating, extending, associating and/or attributing said at least first object property" and/or "assigning at least a portion of said annotation comprising the at least first object property". Moreover, "to the object in one or more [ . . . ] image frames" may refer to "to a corresponding and/or matching object in one or more [ . . . ] image frames" and/or "to the object in one or more selected and/or predeterminable [ . . . ] image frames", whereas "previous and/or subsequent image frames" may refer to "past and/or later image frames". The at least first object property 41 may be assigned to the corresponding object 4' in any selected and/or predeterminable one or more previous and/or subsequent image frames $f_{p/s}$ of the video sequence, for instance ranging from essentially every image frame $f_{p/s}$ to a selection and/or subset thereof. Notably, the at least first object property 41 may be assigned—at least and/or also—to corresponding objects 4' in previous and/or subsequent image frames $f_{p/s}$ for which objects 4' the corresponding object property or properties may—e.g. to a human such as a human annotator—be undetectable. Accordingly, image frames $f_{p/s}$ may be annotated, which would commonly—e.g. based on a per-image basis—not be possible to annotate, e.g. by a human.

Optionally, assigning the at least first property 41 of the object 4 to the object 4' in one or more previous and/or subsequent image frames $f_{p/s}$ may comprise—and/or the property assigning unit 103 may optionally be adapted and/or configured for—carrying out the assigning provided that the determined—e.g. machine-generated—annotation of the object 4 fulfil predeterminable confidence criteria. Thereby, the at least first object property 41 is assigned to other image frames $f_{p/s}$ only provided that the annotation fulfil criteria stipulating at least a first minimum threshold, limit and/or condition in terms of confidence of the annotation. The optional confidence criteria may be represented by any feasible criteria, threshold(s) and/or limit(s) deemed and/or defined as relevant.

As illustrated in an exemplifying manner in exemplifying FIGS. 1-2, the annotation system 1 is further—e.g. by means of a frames identifying unit 104—adapted and/or configured for identifying at least a first of the previous and/or subsequent image frames $f_{p/s}$ in which pixel area dimensions 5 of the object 4' are below an object type- and/or property type-specific threshold stipulating pixel area dimensions below which the at least first object property 41 is defined undetectable, e.g. to a human. Thereby, as exemplified in FIG. 2a, at least a first image frame $f_{p/s}$ of the video sequence—here a previous image frame $f_{p/s}$ exemplified to be associated with a previous arbitrary time stamp $t_{-1}$—may be identified, in which the corresponding object 4'—e.g. due to being relatively far away—has pixel area dimensions 5 smaller than a threshold defining a limit for when an object property of the type of object to which the object 4 belongs—and/or of the type of property to which the at least first object property 41 belongs—is deemed and/or defined to no longer be identifiable, e.g. by a human annotator. Accordingly, there may be singled out one or more image frames $f_{p/s}$—in which the corresponding object 4' has been annotated with the at least first object property 41 as assigned from the original annotation and which corresponding object 4' further has pixel area dimensions 5 which have decreased below the defined object property detectability limit—which image frames $f_{p/s}$ thus have been annotated beyond commonly known and/or ordinary—e.g. human—perception and/or detectability.

Pixel area dimensions 5 of objects 4' in image frames $f_{p/s}$ may be established in any feasible—e.g. known—manner. Furthermore, the at least first previous and/or subsequent image frame may be identified in any feasible manner, such as through evaluation and/or assessment, and the number of identified image frames may be of any feasible quantity. Moreover, the object type may be represented by any feasible—e.g. known—type of object such as e.g. vehicle, human, traffic sign, etc., and similarly, the type of property represented by any feasible—e.g. known—type of object property such as color, text size, object damage, etc. The object type-specific threshold(s) may thus vary with respective feasible object type, and similarly, the property type-specific threshold(s) vary with respective feasible object property type. Respective object type- and/or property type-specific threshold stipulating pixel area dimensions below which the at least first object property 41 is defined undetectable, e.g. to a human, may accordingly be set in any feasible manner, to pixel area dimensions deemed relevant. For instance, an object type-specific pixel area dimensions threshold for an object of e.g. the type vehicle may differ from an object type-specific pixel area dimensions threshold for an object of e.g. the type traffic sign. Similarly, for instance, a property type-specific pixel area dimensions threshold for a property of e.g. the type color may differ from a property type-specific pixel area dimensions threshold for a property of e.g. the type text size and/or a different color. Potentially, the object type-specific and/or property type-specific threshold may further be dependent on characteristics of the image capturing device 3 with which the video sequence is and/or was captured.

The phrase "identifying at least a first of said previous and/or subsequent image frames" may throughout refer to "filtering out and/or singling out at least a first of said previous and/or subsequent image frames" and/or identifying from assessment of one or more of said previous and/or subsequent image frames, at least a first of said previous and/or subsequent image frames", whereas "said at least first object property is defined undetectable, e.g. to a human" throughout may refer to "said at least first object property is deemed undetectable or essentially undetectable, e.g. to a human" and/or "said at least first object property is defined unidentifiable, unrecognizable, unclear and/or non-perceivable, e.g. to a human". Furthermore, the phrase "pixel area dimensions of the object" may refer to "pixel area dimensions of the object in the at least first previous and/or subsequent image frame", "pixel area resolution of the object", and according to an example further to "pixel area dimensions of the object in at least a first predeterminable direction" and/or "pixel area dimensions of the object when unobstructed or essentially unobstructed". Moreover, "are below an object type- and/or property type-specific threshold" may refer to "has decreased below an object type- and/or property type-specific threshold", "are below an object type- and/or property type-dependent threshold", "are below an object type- and/or property type-specific limit and/or object property detectability limit" and/or "are below an object type- and/or property type-specific and potentially further image capturing device characteristics-specific threshold". "Object type- and/or property type-specific threshold stipulating pixel area dimensions below which said at least first object property is defined undetectable, e.g. to a human", on the other hand, may refer to "object type- and/or property type-specific threshold stipulating max pixel area dimensions". Moreover, according to an example, "pixel area dimensions of the object are below an object type- and/or property type-specific threshold stipulating pixel area dimensions below which said at least first object property is defined undetectable, e.g. to a human" may refer to "pixel area dimensions of the object fulfil object type- and/or property type-specific criteria stipulating pixel area dimensions for which said at least first object property is defined undetectable, e.g. to a human".

Additionally or alternatively, the annotation system 1 is further—e.g. by means of the frames identifying unit 104— adapted and/or configured for identifying at least a first of the previous and/or subsequent image frames $f_{p/s}$ in which motion blur 6 in pixels of at least a predeterminable portion of the object 4' exceeds a motion blur threshold stipulating a motion blur level above which the at least first object property 41 is defined undetectable, e.g. to a human. Thereby, as exemplified in FIG. 2b, at least a first image frame $f_{p/s}$ of the video sequence—here a subsequent image frame $f_{p/s}$ exemplified to be associated with a subsequent arbitrary time stamp $t_1$—may be identified, in which the corresponding object 4'—e.g. due to to relative motion and/or relatively high angular velocity—has motion blur 6 in pixels of e.g. a significant portion of the object 4' exceeding a threshold defining a limit for when motion blur is deemed and/or defined to render the at least first object property 41 no longer identifiable, e.g. by a human annotator. Accordingly, there may be singled out one or more image frames $f_{p/s}$—in which the corresponding object 4' has been annotated with the at least first object property 41 as assigned from the original annotation and which corresponding object 4' further has pixels with motion blur that has increased above the defined object property detectability limit—which image frames $f_{p/s}$ thus have been annotated beyond commonly known and/or ordinary—e.g. human—perception and/or detectability.

That is, a commonly known phenomenon which may arise in image frames captured with an image capturing device 3—for instance provided onboard a vehicle 2—is motion blur in the image frame(s), for instance in a pixel area thereof involving a captured object 4'. Such motion blur of a captured object 4' may e.g. arise upon the image capturing device 3—e.g. onboard a vehicle 2—passing the object 4', and/or upon the image capturing device 3 capturing the object 4' while turning relatively rapidly, e.g. while onboard a vehicle 2 driving in a roundabout, in that the image capturing device 3 vs object 4' angular velocity—i.e. the angle rate of change—then may be relatively high. Motion blur may thus e.g. result from the image capturing device 3—e.g. onboard a vehicle 2—moving, turning and/or rotating e.g. relatively rapidly relative the object 4', and/or the object 4'—e.g. represented by another vehicle—moving relatively rapidly relative the image capturing device 3. Motion blur may additionally and/or alternatively further result e.g. from the image capturing device 3—e.g. onboard a vehicle 2 driving on a bump, in a pothole and/or on a rough surface such as e.g. gravel and/or bumpy road—being exposed to jerky movement(s) and/or vibration(s). Moreover, motion blur may yet further additionally and/or alternatively result e.g. from the image capturing device 3 focusing elsewhere than on the object 4' such as focusing on other e.g. object(s) and/or the focus being way off, from image capturing device 3 lens imperfection such as lens softness which e.g. may render corner(s) of an image frame soft, and/or from image capturing device 3 parameters such as aperture, shutter speed and/or ISO etc. being—e.g. temporarily—wrong, e.g. in the case of lens flare. The motion blur in pixels of at least a predeterminable portion of objects 4' in image frames $f_{p/s}$ may be established in any feasible— e.g. known—manner, for instance based on tracking of the object 4 to detect and/or predict relatively large angular velocities, and further for instance taking into consideration characteristics of the image capturing device 3 with which the video sequence is and/or was captured. Furthermore, the at least first previous and/or subsequent image frame may be identified in any feasible manner, such as through evaluation and/or assessment, and the number of identified image frames may be of any feasible quantity. Moreover, the motion blur threshold stipulating a motion blur level above which the at least first object property 41 is defined undetectable, e.g. to a human, may be set in any feasible manner, to a level deemed relevant.

The phrase "motion blur in pixels of at least a predeterminable portion of the object" may refer to "motion blur in pixels of at least a predeterminable portion of the object in the at least first previous and/or subsequent image frame", whereas "motion blur" in this context according to an example may refer to "relative motion-induced motion blur" and/or "angular velocity-induced motion blur". Furthermore, "exceeds a motion blur threshold" may refer to "has reached exceedance of a motion blur threshold" and/or "exceeds a motion blur limit and/or object property detectability limit". "Motion blur threshold stipulating a motion blur level above which said at least first object property is defined undetectable, e.g. to a human", on the other hand, may refer to "motion blur threshold stipulating a min motion blur level". According to an example, "motion blur in pixels of at least a predeterminable portion of the object exceeds a motion blur threshold stipulating a motion blur level above which said at least first object property is defined undetectable, e.g. to a human" may refer to "motion blur in pixels of at least a predeterminable portion of the object fulfil motion blur criteria stipulating motion blur for which said at least first object property is defined undetectable, e.g. to a human".

Moreover, additionally or alternatively, the annotation system 1 is further—e.g. by means of the frames identifying unit 104—adapted and/or configured for identifying at least a first of the previous and/or subsequent image frames $f_{p/s}$ in which brightness 7 in pixels of at least a predeterminable portion of the object 4' exceeds a brightness threshold stipulating a brightness level above which the at least first object property 41 is defined undetectable, e.g. to a human. Thereby, as exemplified in FIG. 2c, at least a first image frame $f_{p/s}$ of the video sequence—here a subsequent image frame $f_{p/s}$ exemplified to be associated with a subsequent arbitrary time stamp $t_1$—may be identified, in which the corresponding object 4'—e.g. due to to sunlight and/or glare and/or relatively rapid lighting changes—has brightness 7—and/or potentially brightness change rate—in pixels of e.g. a significant portion of the object 4' exceeding a threshold defining a limit for when brightness—and/or potentially brightness change rate—is deemed and/or defined to render the at least first object property 41 no longer identifiable, e.g. by a human annotator. Accordingly, there may be singled out one or more image frames $f_{p/s}$—in which the corresponding object 4' has been annotated with the at least first object property 41 as assigned from the original annotation and which corresponding object 4' further has pixels with brightness—and/or potentially brightness change rate—that has increased beyond the defined object property detectability limit—which image frames $f_{p/s}$ thus have been annotated beyond commonly known and/or ordinary—e.g. human—perception and/or detectability.

That is, a commonly known phenomenon which may arise in image frames captured with an image capturing device 3—for instance provided onboard a vehicle 2—is brightness and/or a relatively rapid brightness change rate in the image frame(s), for instance in a pixel area thereof involving a captured object 4'. Such brightness and/or rapid brightness change rate of a captured object 4' may e.g. arise upon the image capturing device 3—e.g. onboard a vehicle 2—being subjected to sunlight and/or glare and/or to lighting changing relatively rapidly, e.g. upon leaving—and/or entering—a relatively dark tunnel. The brightness—and/or potentially brightness change rate—in pixels of at least a predeterminable portion of objects 4' in image frames $f_{p/s}$ may be established in any feasible—e.g. known—manner, for instance based on pixel measurements and/or tracking of the object 4 to detect and/or predict relatively large brightness change rates. Furthermore, the at least first previous and/or subsequent image frame may be identified in any feasible manner, such as through evaluation and/or assessment, and the number of identified image frames may be of any feasible quantity. Moreover, the brightness threshold—and/or potentially brightness change rate threshold—stipulating a brightness level—and/or potentially a brightness change rate level—above which the at least first object property 41 is defined undetectable, e.g. to a human, may be set in any feasible manner, to a level deemed relevant.

The phrase "brightness in pixels of at least a predeterminable portion of the object" may refer to "brightness in pixels of at least a predeterminable portion of the object in the at least first previous and/or subsequent image frame", whereas "brightness" according to an example may refer to "brightness change rate". Furthermore, "exceeds a brightness threshold" may refer to "has reached exceedance of a brightness threshold" and/or "exceeds a brightness limit and/or object property detectability limit". "Brightness threshold stipulating a brightness level above which said at least first object property is defined undetectable, e.g. to a human", on the other hand, may refer to "brightness threshold stipulating a min brightness level". According to an example, "brightness in pixels of at least a predeterminable portion of the object exceeds a brightness threshold stipulating a brightness level above which said at least first object property is defined undetectable, e.g. to a human" may refer to "brightness in pixels of at least a predeterminable portion of the object fulfil brightness criteria stipulating brightness for which said at least first object property is defined undetectable, e.g. to a human".

As illustrated in an exemplifying manner in exemplifying FIG. 1, the annotation system 1 is further—e.g. by means of an annotation data appointing unit 105—adapted and/or configured for appointing the at least first identified image frame as annotation data. Thereby, a data set of annotated image frames is accomplished in an efficient manner—derived and/or generated out of an original e.g. single annotated image frame $f_0$—covering annotations—comprising the assigned object properties 41—for objects 4' which corresponding object properties in the prevailing image frames are deemed unidentifiable. Accordingly, there is provided and/or supported an extended automatically generated annotation data set—e.g. intended for computer vision machine learning algorithm training e.g. intended for an ADS 21—which data set covers image frames which traditionally—e.g. based on a per-image basis—would not be possible to annotate. Consequently, according to an example, with the introduced concept, by using a video sequence and a e.g. human-annotated image frame $f_0$ thereof as described herein, there may be created a data set of annotations not limited by e.g. human perception.

The at least first identified image frame may be appointed in any feasible manner, comprising for instance being extracted and/or stored. The phrase "appointing [ . . . ] as annotation data" may thus refer to "collecting, gathering, providing, storing, extracting, tagging, flagging, marking and/or assigning [ . . . ] as annotation data", whereas "appointing the at least first identified image frame" may refer to "appointing the at least first object property and the object in the at least first identified image frame" and/or "appointing at least a portion of the at least first identified image frame". According to an example, "appointing [ . . . ] as annotation data" may further refer to "appointing [ . . . ] as annotation data for—and/or intended for—computer vision machine learning algorithm training", whereas "machine learning algorithm" throughout may refer to "machine learning model". Subsequently, optionally, as touched upon in the foregoing and as illustrated in an exemplifying manner in exemplifying FIG. 1, the annotation system 1 may thus further—e.g. by means of an optional algorithm training unit 106—be adapted and/or configured for training a computer vision machine learning algorithm based on the annotation data. Thereby, one or more computer vision machine learning models may be trained—at least in part—using—at least a portion of—the appointed annotation data set. Accordingly, such training may be achieved in a—e.g. time and/or cost—efficient manner. Providing annotation data sets as suggested herein and further using said data sets for training of computer vision machine learning algorithm(s), may for instance eventually result in computer vision machine learning algorithm(s) from which e.g. human perception may be removed as a fundamental limiting factor to the computer vision machine learning algorithm(s). Further optionally, and as briefly touched upon above, the training may comprise—and/or the optional algorithm training unit 106 may be adapted and/or configured for—training a computer vision machine learning algorithm configured to be deployed by an ADS 21. Thereby, the computer vision machine algorithm under training is intended for use in automated driving applications, for instance in a perception system of the ADS 21. The optional training of the computer vision machine learning algorithm—which optionally may be configured to be deployed by an ADS 21—may take place at any arbitrary feasible location, such as at an offboard entity and/or facility. Optionally, however, the training may comprise—and/or the optional algorithm training unit 106 may be adapted and/or configured for—performing the training on-edge of the vehicle 2. Thereby, the training of the computer vision machine learning algorithm may take place onboard the—e.g. ADS-equipped—vehicle 2, potentially ultimately supporting a federated approach involving a fleet of ADS-equipped vehicles where one or more vehicle's 2 vision machine learning algorithm may be provided to an external server for consolidation into a global computer vision machine learning algorithm which subsequently may be pushed to said fleet. The computer vision machine learning algorithm(s) discussed above may for instance be in shadow mode, under training and/or currently deployed, and may—or may not—further be represented by the previously discussed optional computer vision machine learning algorithm onboard the—e.g. ADS-equipped—vehicle 2, from which the annotation of the object 4 optionally may be derived.

As further shown in FIG. 1, the annotation system 1 comprises an annotation determining unit 101, an object tracking unit 102, a property assigning unit 103, a frames identifying unit 104, an annotation data appointing unit 105 and an optional algorithm training unit 106, all of which already have been described in greater detail above. Furthermore, the embodiments herein for supporting annotation of objects in image frames of a traffic environment-related video sequence may be implemented through one or more processors, such as a processor 107, for instance represented by at least a first Central Processing Unit, CPU, at least a first Graphics Processing Unit, GPU, at least a first Tensor Processing Unit, TPU, and/or at least a first Field-Programmable Gate Array, FPGA, together with computer program code for performing the functions and actions of the embodiments herein. Said program code may also be provided as a computer program product, for instance in the form of a data carrier carrying computer program code for performing the embodiments herein when being loaded into the annotation system 1. One such carrier may be in the form of a CD/DVD ROM disc and/or a hard drive, it is however feasible with other data carriers. The computer program code may furthermore be provided as pure program code on a server and downloaded to the annotation system 1. The annotation system 1 may further comprise a memory 108 comprising one or more memory units. The memory 108 optionally includes high-speed random access memory, such as DRAM, SRAM, DDR RAM, or other random access solid-state memory devices, and further optionally includes non-volatile memory, such as one or more magnetic disk storage devices, optical disk storage devices, flash memory devices, or other non-volatile solid-state storage devices. Moreover, the memory 108 may be arranged to be used to store e.g. information, and further to store data, configurations, scheduling, and applications, to perform the methods herein when being executed in the annotation system 1. For instance, the computer program code may be implemented in the firmware, stored in FLASH memory 108, of an embedded processor 107, and/or downloaded wirelessly e.g. from a server. Furthermore, the annotation determining unit 101, the object tracking unit 102, the property assigning unit 103, the frames identifying unit 104, the annotation data appointing unit 105, the optional algorithm training unit 106, the optional processor 107 and/or the optional memory 108, may at least partly be comprised in one or more systems 109 offboard a vehicle 2, for instance involving one or more servers, and/or comprised in one or more nodes 110 e.g. ECUs of a vehicle 2 e.g. in and/or in association with an ADS 21 thereof. It should thus be understood that parts of the described solution potentially may be implemented in a system 109 located external a vehicles 2, or in a combination of internal and external a vehicle 2, such as in a distributed system and/or solution, for instance further in a so-called cloud solution. Those skilled in the art will also appreciate that said units 101-106 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 108, that when executed by the one or more processors such as the processor 107 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip (SoC).

Figure 3:
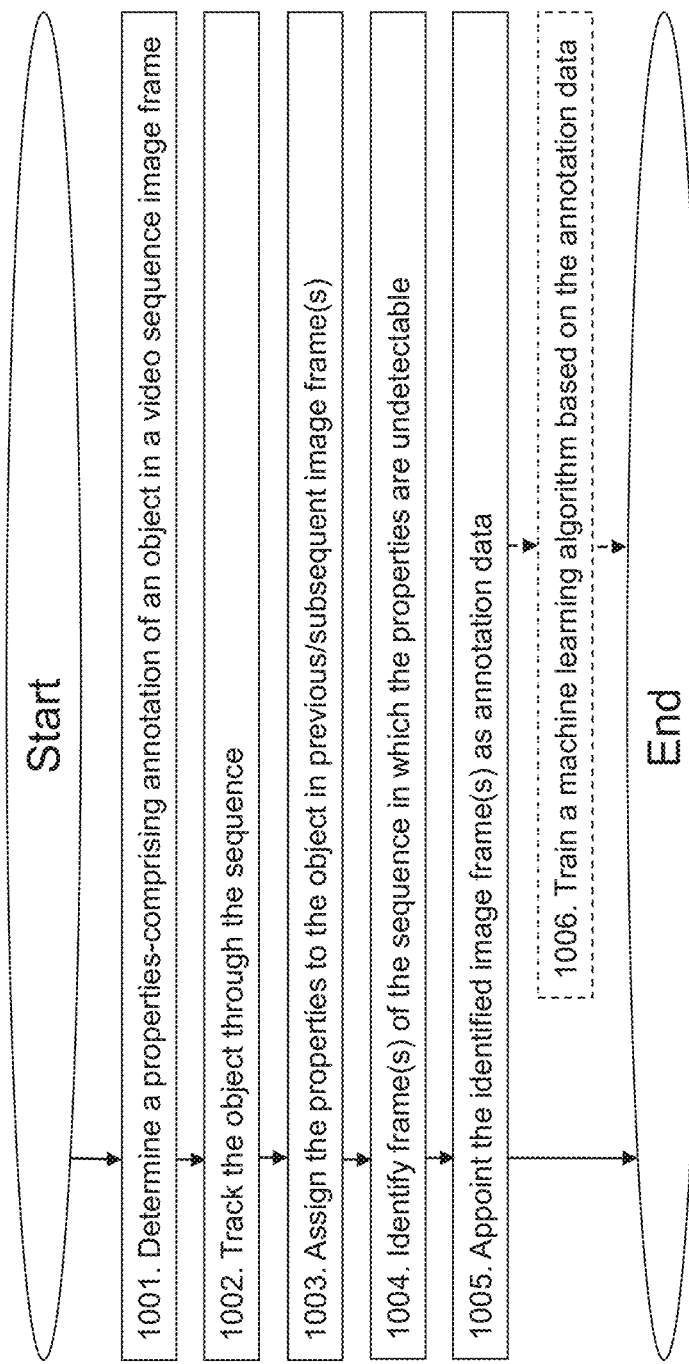
FIG. 3 is a flowchart depicting an exemplifying method performed by an annotation system according to embodiments of the disclosure.

FIG. 3 is a flowchart depicting an exemplifying method performed by an annotation system 1 according to embodiments of the disclosure. Said method is for supporting annotation of objects in image frames of a traffic environment-related video sequence. The exemplifying method, which may be continuously repeated, comprises one or more of the following actions discussed with support from FIGS. 1 and 2. Moreover, the actions may be taken in any suitable order and/or one or more actions may be performed simultaneously and/or in alternate order where applicable.

Action 1001

In Action 1001, the annotation system 1 determines—e.g., with support from the annotation determining unit 101—an annotation of an object 4 in an image frame $f_o$ of the video sequence, which annotation comprises at least a first property 41 of the object 4.

Optionally, Action 1001 may comprise—and/or the annotation determining unit 101 may optionally be adapted and/or configured for—deriving the annotation from a computer vision machine learning algorithm onboard a vehicle 2.

Action 1002

In Action 1002, the annotation system 1 tracks—e.g. with support from the object tracking unit 102—the object 4 through the video sequence.

Action 1003

In Action 1003, the annotation system 1 assigns—e.g. with support from the property assigning unit 103—the at least first object property 41 to the object 4' in one or more previous and/or subsequent image frames $f_{p/s}$ of the video sequence.

Optionally, Action 1003 may comprise—and/or the property assigning unit 103 may optionally be adapted and/or configured for—carrying out the assigning provided that the determined annotation of the object 4 fulfil predeterminable confidence criteria.

Action 1004

In Action 1004, the annotation system 1 identifies—e.g. with support from the frames identifying unit 104—at least a first of the previous and/or subsequent image frames $f_{p/s}$ in which:

pixel area dimensions 5 of the object 4' are below an object type- and/or property type-specific threshold stipulating pixel area dimensions below which the at least first object property 41 is defined undetectable, e.g. to a human; and/or motion blur 6 in pixels of at least a predeterminable portion of the object 4' exceeds a motion blur threshold stipulating a motion blur level above which the at least first object property 41 is defined undetectable, e.g. to a human; and/or brightness 7 in pixels of at least a predeterminable portion of the object 4' exceeds a brightness threshold stipulating a brightness level above which the at least first object property 41 is defined undetectable, e.g. to a human.

Action 1005

In Action 1005, the annotation system 1 appoints—e.g. with support from the annotation data appointing unit 105—the at least first identified image frame as annotation data.

Action 1006

In optional Action 1006, the annotation system 1 may train—e.g. with support from the optional algorithm training unit 106—a computer vision machine learning algorithm based on the annotation data.

Optionally, Action 1006 may comprise—and/or the algorithm training unit 106 may optionally be adapted and/or configured for—training a computer vision machine learning algorithm configured to be deployed by an ADS 21.

Further optionally, Action 1006 may comprise—and/or the algorithm training unit 106 may optionally be adapted and/or configured for—performing the training on-edge of the vehicle 2.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by an annotation system for supporting annotation of objects in image frames of a traffic environment-related video sequence, the method comprising:
    determining an annotation of an object in an image frame of the video sequence, the annotation comprising at least a first property of the object;
    tracking the object through the video sequence;
    assigning the at least first object property to the object in one or more previous and/or subsequent image frames of the video sequence;
    identifying at least a first of one or both of the previous and subsequent image frames in which one or more:
        pixel area dimensions of the object are below one or both of an object type- and property type-specific threshold stipulating pixel area dimensions below which the at least first object property is defined undetectable; and
        motion blur in pixels of at least a predeterminable portion of the object exceeds a motion blur threshold stipulating a motion blur level above which the at least first object property is defined undetectable; and
        brightness in pixels of at least a predeterminable portion of the object exceeds a brightness threshold stipulating a brightness level above which the at least first object property is defined undetectable; and
    appointing the at least first identified image frame as annotation data.

2. The method according to claim 1, further comprising:
    training a computer vision machine learning algorithm based on the annotation data.

3. The method according to claim 2, wherein the training comprises training a computer vision machine learning algorithm configured to be deployed by an Automated Driving System, ADS.

4. The method according to claim 2, wherein the determining an annotation of an object comprises deriving the annotation from a computer vision machine learning algorithm onboard a vehicle.

5. The method according to claim 2, wherein the assigning the at least first property of the object to the object in one or both of one or more previous and subsequent image frames, comprises carrying out the assigning provided that the determined annotation of the object fulfil predeterminable confidence criteria.

6. The method according to claim 1, wherein the determining an annotation of an object comprises deriving the annotation from a computer vision machine learning algorithm onboard a vehicle.

7. The method according to claim 6, wherein the training comprises performing the training on-edge of the vehicle.

8. The method according to claim 1, wherein the assigning the at least first property of the object to the object in one or both of one or more previous and subsequent image frames, comprises carrying out the assigning provided that the determined annotation of the object fulfil predeterminable confidence criteria.

9. The method according to claim 1, wherein the at least first object property is defined undetectable to a human.

10. An annotation system for supporting annotation of objects in image frames of a traffic environment-related video sequence, the annotation system comprising:
    an annotation determining unit configured to determine an annotation of an object in an image frame of the video sequence, the annotation comprising at least a first property of the object;
    an object tracking unit configured to track the object through the video sequence;
    a property assigning unit configured to assign the at least first object property to the object in one or more previous and/or subsequent image frames of the video sequence;
    a frames identifying unit configured to identify at least a first of the one or both of the previous and subsequent image frames in which one or more:
        pixel area dimensions of the object are below one or both of an object type- and property type-specific threshold stipulating pixel area dimensions below which the at least first object property is defined undetectable; and
        motion blur in pixels of at least a predeterminable portion of the object exceeds a motion blur threshold stipulating a motion blur level above which the at least first object property is defined undetectable; and
        brightness in pixels of at least a predeterminable portion of the object exceeds a brightness threshold stipulating a brightness level above which the at least first object property is defined undetectable; and
    an annotation data appointing unit configured to appoint the at least first identified image frame as annotation data.

11. The annotation system according to claim 10, further comprising:
    an algorithm training unit configured to train a computer vision machine learning algorithm based on the annotation data.

12. The annotation system according to claim 11, wherein the algorithm training unit is configured to train a computer vision machine learning algorithm configured to be deployed by an Automated Driving System, ADS.

13. The annotation system according to claim 11, wherein the annotation determining unit is configured to derive the annotation from a computer vision machine learning algorithm onboard a vehicle.

14. The annotation system according to claim 11, wherein the property assigning unit is configured to carry out the assigning provided that the determined annotation of the object fulfil predeterminable confidence criteria.

15. The annotation system according to claim 10, wherein the annotation determining unit is configured to derive the annotation from a computer vision machine learning algorithm onboard a vehicle.

16. The annotation system according to claim 15, wherein the algorithm training unit is configured to perform the training on-edge of the vehicle.

17. The annotation system according to claim 10, wherein the property assigning unit is configured to carry out the assigning provided that the determined annotation of the object fulfil predeterminable confidence criteria.

18. The annotation system according to claim 10, wherein the annotation system is comprised in one of an offboard system and a vehicle.

19. The annotation system according to claim 10, wherein the at least first object property is defined undetectable to a human.

20. A non-transitory computer storage medium storing a computer program arranged to cause a computer or a processor to support annotation of objects in image frames of a traffic environment-related video sequence by:
  determining an annotation of an object in an image frame of the video sequence, the annotation comprising at least a first property of the object;
  tracking the object through the video sequence;
  assigning the at least first object property to the object in one or more previous and/or subsequent image frames of the video sequence;
  identifying at least a first of one or both of the previous and subsequent image frames in which one or more:
    pixel area dimensions of the object are below one or both of an object type- and property type-specific threshold stipulating pixel area dimensions below which the at least first object property is defined undetectable; and
    motion blur in pixels of at least a predeterminable portion of the object exceeds a motion blur threshold stipulating a motion blur level above which the at least first object property is defined undetectable; and
    brightness in pixels of at least a predeterminable portion of the object exceeds a brightness threshold stipulating a brightness level above which the at least first object property is defined undetectable; and
  appointing the at least first identified image frame as annotation data.

\* \* \* \* \*